United States Patent [19]  [11] Patent Number: 4,520,253
Gamo et al.  [45] Date of Patent: May 28, 1985

[54] WIRE-CUT ELECTRIC DISCHARGE MACHINE CONTROL SYSTEM TO COMPENSATE FOR WIRE FLEXURE DURING MACHINING

[75] Inventors: Gotaro Gamo; Mitsuo Kinoshita, both of Hachioji; Haruki Obara, Sagamihara, all of Japan

[73] Assignee: Fanuc Ltd, Minamitsuru, Japan

[21] Appl. No.: 414,364

[22] PCT Filed: Dec. 28, 1981

[86] PCT No.: PCT/JP81/00422
§ 371 Date: Aug. 26, 1982
§ 102(e) Date: Aug. 26, 1982

[87] PCT Pub. No.: WO82/02356
PCT Pub. Date: Jul. 22, 1982

[30] Foreign Application Priority Data

Dec. 30, 1980 [JP] Japan ............................... 55-186737

[51] Int. Cl.³ ................................................. B23P 1/08
[52] U.S. Cl. ................................ 217/69 W; 219/69 M
[58] Field of Search ............... 219/69 M, 69 W, 69 E, 219/69 C

[56] References Cited

U.S. PATENT DOCUMENTS 4,081,652 3/1978 Janicke et al. .................... 219/69 W
4,314,133 2/1982 Pfau et al. ........................ 219/69 W

FOREIGN PATENT DOCUMENTS 2826489 3/1979 Fed. Rep. of Germany ... 219/69 W

Primary Examiner—M. H. Paschall
Attorney, Agent, or Firm—Staas & Halsey

[57] ABSTRACT

There is disclosed a method of controlling a wire-cut electric discharge machine to correct cutting errors due to flexing of a wire electrode caused by electric discharge. A processing unit processes data ($x_1$, $y_1$, $r_1$, $x_2$, $y_2$) on a corner shape which is given by a paper tape and data on an amount of flexing ($D_0$) upon rectilinear cutting for calculating a corrected radius of curvature $r_1'$ of the corner, and determines the center Pc of an arc having the radius of curvature $r_1'$ and contacting straight lines ($l_1$, $l_2$) and points of contact Pt, Pt' to move the wire electrode along a straight line $P_1Pt$, an arc $PtPt'$, and a straight line $Pt'P_3$ to thereby correct the cutting error at the corner.

3 Claims, 13 Drawing Figures

Fig. I

WIRE-CUT ELECTRIC DISCHARGE MACHINE CONTROL SYSTEM TO COMPENSATE FOR WIRE FLEXURE DURING MACHINING

BACKGROUND OF THE INVENTION

The present invention relates to a method of controlling wire-cut electric discharge machine to prevent cutting errors which would be produced upon flexing of a wire electrode when a corner is cut during an electric discharge cutting operation, and more particularly to a simple method of controlling a wire-cut electric discharge machine to carefully cut a corner.

Wire-cut electric discharge machines operate on the principle that a voltage is applied across a gap between a wire electrode and a workpiece to generate a spark discharge across the gap for cutting the workpiece with the spark energy. The workpiece can be cut to a desired contour by moving the workpiece with respect to the wire electrode based on cutting command data.

More specifically, as schematically shown in FIG. 1 which shows a known wire-cut electric discharge machine, a wire 1 is reeled out of a reel $RL_1$, extends between a lower guide 4 and an upper guide 4, and is wound around a reel $RL_2$. A voltage is applied by a contact electrode (not shown) to the wire to generate a discharge between the wire 1 and the workpiece 2 for cutting off the latter. The workpiece 2 is fastened to a table TB movable by motors MX, MY in directions X, Y, respectively. Thus, the workpiece 2 can be cut to a desired configuration by moving the table TB in the directions X, Y. The upper guide 4 is attached to a moving mechanism MMC movable by motors MU, MV in the directions X, Y, respectively so that the upper guide 4 is movable in the directions X, Y.

The moving mechanism, the reels $RL_1$, $RL_2$, and the lower guide 4 are mounted on a column CM.

A numerical control unit NC serves to read the contents of a command tape TP, and has a distributor circuit DS for distributing commands for respective axes and drive circuits SVX, SVY, SVU, SVV for the corresponding axes for energizing the motors MX, MY, MU, MV respectively for the axes to move the table TB and the moving mechanism until the workpiece 2 is cut to a desired shape.

FIG. 2 is illustrative of a cutting operation of such an electric discharge cutting machine. When the wire electrode 1 moves in and along a slot 3 in a given direction while cutting off the workpiece 2 with electric discharge, a pressure is developed between the wire electrode 1 and the workpiece due to the electric discharge to which pushes the wire electrode 1 back in the direction of the arrows which is opposite to the direction in which the electrode 1 moves along, as shown in the cross-sectional view of FIG. 3. The wire electrode 1 is therefore backed off or flexes from the position of the wire guides 4, 4. The cutting accuracy is not affected to an appreciable extent by the amount of such flexing as long as the wire electrode 1 cuts the workpiece 2 along a rectilinear slot. However, the amount of flexing causes a serious problem when the wire electrode 1 cuts the workpiece to form a corner. Thus, as shown in FIG. 4 which is a plan view of a cut slot, a slot 3 is composed of a first rectilinear slot L1 and a second rectilinear slot L2 extending perpendicularly to the first rectilinear slot L1, and defining such a combined slot 3 requiring a corner CN to be cut at the junction between the first and second rectilinear slots L1, L2. To this end, the workpiece 2 and the wire electrode 1 are caused to move relatively in one direction to form the first rectilinear slot L1, and thereafter the direction of such relative movement needs to be a right angle as directed by a cutting command to form the second rectilinear slot L2. The wire electrode 1 however has a tendency to be dragged inwardly of the corner CN due to the flexing of the wire electrode 1 at a position in which the electric discharge takes place, with the result that the contour of the slot 3 as it is cut is distorted considerably inwardly and becomes blunt as shown by the dotted lines, a configuration which is different from a commanded shape (shown by the solid lines).

FIG. 5 is a plan view of an arcuate corner CN' to be formed between first and second rectilinear slots L1, L2. In cutting such an arcuate corner CN', the flexing of the wire electrode 1 due to the electric discharge causes the corner CN' to be cut along a path shown by the dotted lines which is duller than a commanded shape as illustrated by the solid lines.

It is known that the cutting errors at such arcuate and angular corners can be reduced by changing the path of cutting, the cutting power supply, the speed of feed, and other factors. However, there are a great many combinations of such cutting conditions available, and the customary practice has been complex and impractical since no specific standard has been established for controlling the cutting path, the feeding speed, and the cutting power supply voltage.

Accordingly, it is an object of the present invention to provide a simple method of controlling a wire-cut electric discharge machine to improve blunt corner shapes.

Another object of the present invention is to provide a method of controlling a wire-cut electric discharge machine to correct the radius of curvature of an arcuate corner into an optimum radius of curvature by taking flexing of a wire electrode into consideration for cutting the arcuate corner with greatly increased accuracy.

SUMMARY OF THE INVENTION

With the present invention, data on an amount of flexing measured in advance while cutting a workpiece along a straight line is stored, and data on a commanded radius of curvature of a corner is corrected by the data on the amount of flexing when cutting the corner. The workpiece is moved with respect to a wire electrode along an arc determined by the corrected radius of curvature for electric discharge cutting of the workpiece with the wire electrode. Since the wire electrode follows the commanded arc, the corner can be cut more accurately.

DETAILED DESCRIPTION OF THE PREFERRED EMBODIMENTS

The present invention will now be described in more detail with reference to the drawings.

While cutting a workpiece along a straight line, a wire electrode flexes in a direction (tangential direction) opposite to the direction in which cutting progresses due to electric discharge pressure developed during the cutting operation. When the workpiece is cut along an arc or a corner, the wire electrode flexes not only in a tangential direction but also inwardly of the arc or in a radial direction due to different amounts cut outwardly and inwardly of a central path of movement of the wire electrode. For high-precision electric discharge cutting using a cutting wire, the cutting control is required to take into consideration both a force applied in a direction tangential to the path along which the workpiece is cut by the wire and a force imposed in a radial direction. According to the present invention, these forces, namely, amounts of flexing in the tangential and radial directions are taken into account for correcting the path of movement of the wire to prevent the shape of the corner from becoming blunt.

Processes of deriving equations for determining an amount of flexing $D_T$ in the tangential direction and an amount of flexing $D_R$ in the radial direction, and of correcting a path along which cutting is effected using the amounts of flexing $D_T$, $D_R$ will successively be described.

Figure 1:
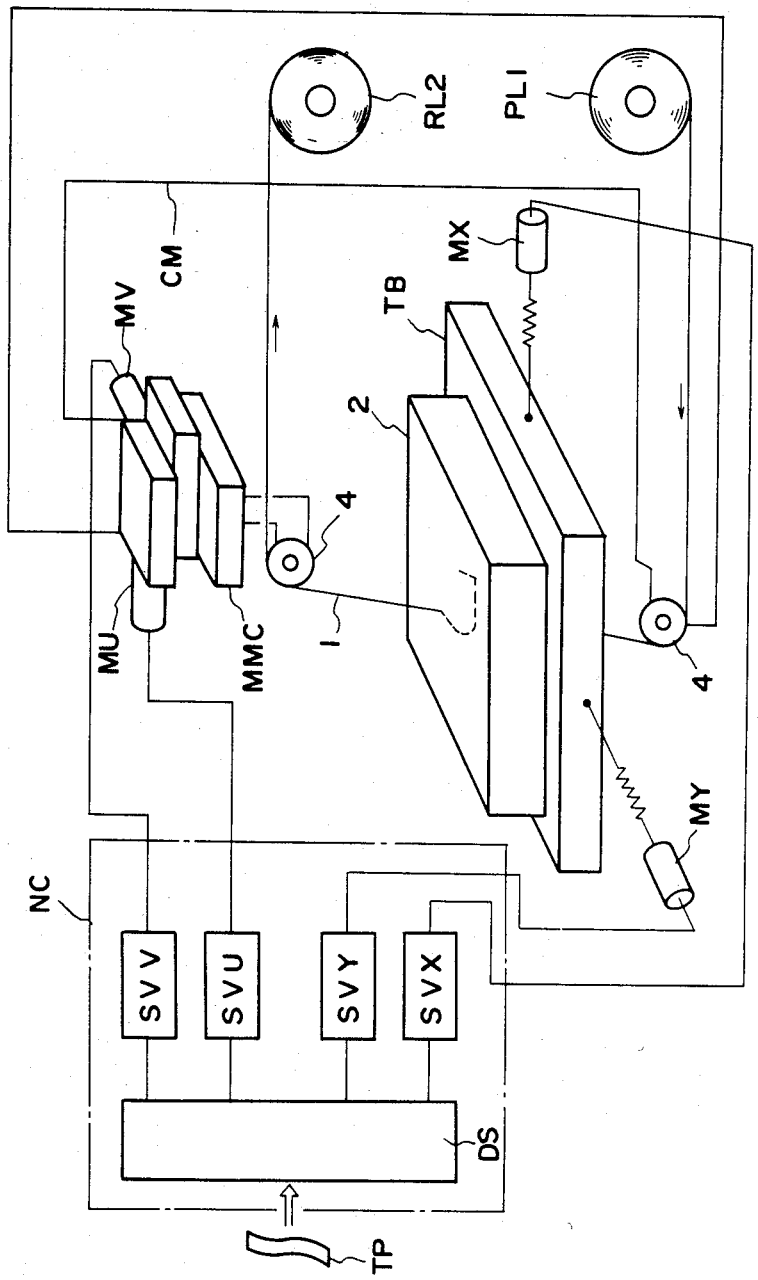
FIG. 1 is a schematic view of a wire-cut electric discharge machine.
Figure 2:
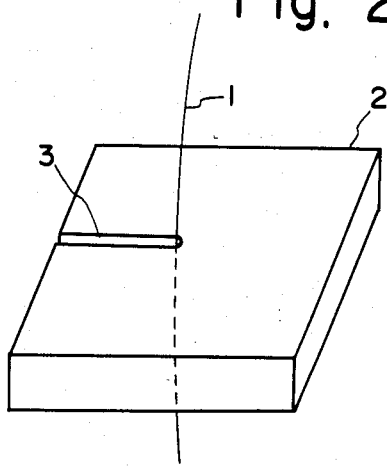
FIG. 2 is a perspective view illustrative of the principle on which a workpiece is cut by a wire due to electric discharge.
Figure 3:
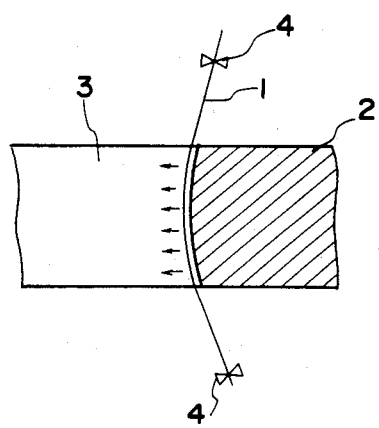
FIG. 3 is a cross-sectional view explanatory of flexing of the wire electrode.
Figure 4:
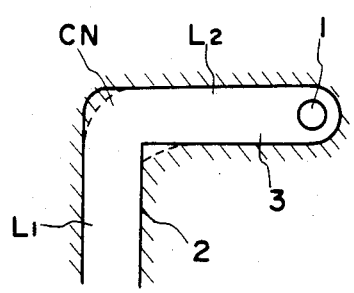
FIGS. 4 and 5 are plan views explanatory of problems with a conventional electric discharge cutting process.
Figure 5:
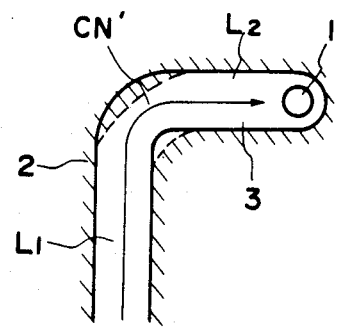
Figure 6:
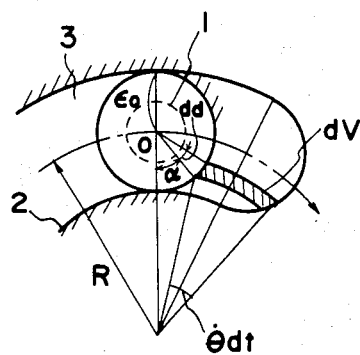
FIGS. 6, 7, 8 and 9 are diagrams explanatory of arithmetic operations for determining amounts of flexing in tangential and radial directions.

(A) Derivation of equations for determining the amounts of flexing $D_T$, $D_R$ in the tangential and radial directions:

It is assumed that a wire electrode 1 moves along an arcuate path having a radius of curvature R to cut a workpiece 2 for forming a slot having a width $2\epsilon_0$, as shown in FIG. 6.

When the wire electrode 1 moves through an angle $\theta dt$ within a time dt, a differentiated value $d\dot{V}$ of an amount of cutting with respect to time at the position of an angle $\alpha$ in FIG. 6 for a workpiece having a unit thickness is given as follows:

$$d\dot{V} = \frac{d}{dt}(dV)$$

$$= (R - \epsilon_0 \cos \alpha) \dot{\theta} dt \, \epsilon_0 d\alpha \sin \alpha / dt$$

Since a feeding speed F is:

$$F = R\theta \qquad (1)$$

the following equation can be established:

$$d\dot{V} = F \epsilon_0 \left( \sin \alpha - \frac{\epsilon_0}{R} \sin \alpha \cos \alpha \right) d\alpha \qquad (2)$$

On the assumption that electric discharge is produced on the front face of the wire electrode 1, $d\dot{V}$ is integrated from $\alpha = 0$ to $\pi$ and the following equation results:

$$\dot{V} = 2F\epsilon_0 \qquad (3)$$

Figure 7:
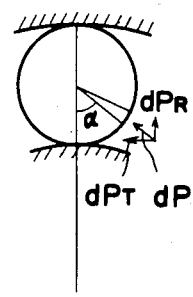

With the wire electrode 1 at the position of the angle $\alpha$ of FIG. 6 being under pressure as shown in FIG. 7, the following presumptions 1 and 2 are presented:

1. The pressure imposed by electric discharges on the wire electrode surface is proportional to the frequency of the electric discharges, which is in turn proportional to an amount of cutting per unit time, namely, the speed of cutting; and 2. The pressure acts perpendicularly on the wire electrode surface.

Therefore, a force $dP_R$ acting radially on the wire electrode 1 due to the amount of cutting $d\dot{V}$ per unit time is given by:

$$dP_R = dP \cos \alpha \qquad (4)$$

$$= K \, d\dot{V} \cos \alpha$$

$$= KF \epsilon_0 \left( \sin \alpha < \frac{\epsilon_0}{R} \sin \alpha \cos \alpha \right) d\alpha \cos \alpha$$

By integrating the force $dP_R$ from $\alpha = 0$ to $\pi$ (the force $dP_R$ is directed outwardly), the following results:

$$P_R = \frac{2}{3R} KF \epsilon_0^2 \qquad (5)$$

where K is a proportionality constant. Although $P_R$ in fact varies with the energy of a single electric discharge, such energies are assumed here to be equal (by rendering C, V in $CV^2/2$ constant).

Likewise, a force $dP_T$ acting on the wire electrode 1 in the tangential direction is given by:

$$dP_T = dP \sin \alpha$$

$$= KF \epsilon_0 \left( \sin \alpha < \frac{\epsilon_0}{R} \sin \alpha \cos \alpha \right) d\alpha \sin \alpha$$

By integrating the force $dP_T$ from $\alpha = 0$ to $\pi$, the following results:

$$P_T = \frac{\pi}{2} KF \epsilon_0 \qquad (6)$$

As is apparent from the equations (3), (6), $\dot{V}$ and $P_T$ are not dependent on the radius of curvature R of the arc, and are regarded as an amount of cutting on rectilinear cutting and a force applied to the wire electrode 1.

Figure 8:
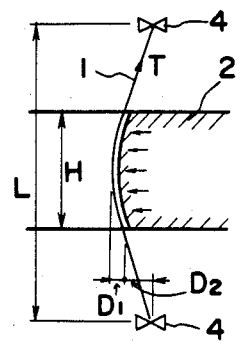

The amount of flexing of the wire electrode 1 can approximately be expressed in FIG. 8 as follows:

$$D_1 = PH/4T$$

$$D_2 = (L-H)P/2T$$

$$D = D_1 + D_2 = K_2 P \quad (7)$$

where P is the pressure, H is the thickness of the workpiece 2, L is the vertical distance between guides 4, 4, and T is the tension to which the wire electrode is subjected.

The equation (7) indicates that the amount of flexing D is in proportion to the force acting on the wire electrode 1. With the presumption 1 in view, and assuming that an amount of flexing upon rectilinear cutting at a cutting speed $F_0$ is indicated by $D_0$, and amounts of flexing due to the forces $P_T$, $P_R$ respectively in the tangential and radial directions are indicated by $D_T$, $D_R$, respectively, the following equations are established:

$$\frac{D_T}{D_0} = \frac{P_T}{P_0} = \frac{F}{F_0} \quad (8)$$

$$\frac{D_R}{D_0} = \frac{P_R}{P_0} = \frac{4}{3\pi} \frac{F}{F_0} \frac{\epsilon_0}{R} \quad (9)$$

The equation (9) can be derived using the equations (5), (6) and (7).

Figure 9:
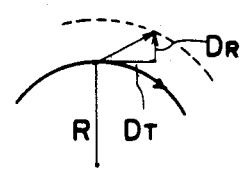

From the equations (8), (9), the amounts of flexing $D_T$, $D_R$ in the tangential and radial directions can be determined if the amount of flexing $D_0$ upon rectilinear cutting at the cutting speed $F_0$, and the width $2\epsilon_0$ of the slot cut are measured. Proper cutting operation can be effected at all times by correcting the path of movement of the wire electrode by the intervals $D_T$, $D_R$. Therefore, for cutting the workpiece along an arc as shown in FIG. 9, a path of movement should be followed which is advanced $D_T$, $D_R$ respectively in the tangential and radial directions. $D_R = 0$ for cutting the workpiece along a straight line.

The arithmetic operation involving $D_T$, $D_R$ requires $D_0$, F, $F_0$, $\epsilon_0$, R. The radius of curvature R is found from cutting data, and the slot width $2\epsilon_0$ is determined in advance by actually cutting the workpiece on a test basis and measuring its dimensions, the data being stored in an numerical control (NC) unit. The actual feed speed F is already known. Consequently, the NC unit must be supplied with data on the amount of flexing $D_0$ upon rectilinear cutting and data on the cutting speed $F_0$ upon such rectilinear cutting for the arithmetic operation to determine $D_T$, $D_R$.

Figure 10:
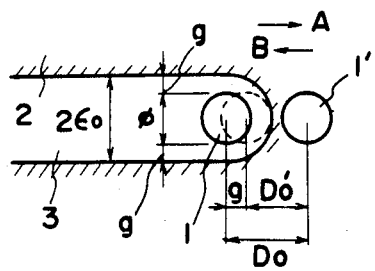
FIG. 10 is a diagram illustrative of a process of measuring an amount of flexing while cutting along a straight line.

(B) Measurement of the amount of flexing $D_0$ upon rectilinear cutting:

FIG. 10 is illustrative of measurement of the amount of flexing $D_0$. The amount of flexing $D_0$ upon rectilinear cutting can be measured as follows:

During rectilinear cutting, electric discharge is temporarily stopped at a predetermined point of measurement (FIG. 10). With electric discharge thus stopped, the wire electrode no longer undergoes electric discharge pressure, whereupon the wire electrode 1 is pulled in the direction toward the wire guides (see the dotted line in FIG. 10) until the wire electrode 1 is held against the workpiece 2. When the wire electrode 1 contacts the workpiece 2, a contact sensor device detects such a contact.

After the wire electrode 1 has been brought into contact with the workpiece 2, the wire electrode 1 is backed off along the cutting path with respect to the workpiece 2. The wire electrode 1 may be moved back by displacing the table with the workpiece placed thereon in the direction of the arrow A with respect to the wire electrode 1, or moving back the wire guides in the direction of the arrow B with respect to the workpiece 2 where the electric discharge cutting machine has movable wire guides.

Continued withdrawal of the wire electrode causes the latter to be out of contact with the workpiece at a certain position. A distance $F_0'$ which the wire electrode traverses in moving back from the position in which electric discharge is stopped to the position in which the wire electrode starts to disengage from the workpiece is measured, and the measured data is stored in a memory in the NC unit.

Then, a real amount of flexing $D_0$ is calculated according to the following equation to thereby complete the measurement of the amount of flexing:

$$D_0 = g + D_0' \quad (10)$$

where g is the gap across which electric discharge takes place and can be determined by:

$$g = (2\epsilon_0 - \phi)/2 \quad (11)$$

where $2\epsilon_0$ is the width of the slot and $\phi$ is the diameter of the wire electrode, as shown in FIG. 10. Accordingly, by measuring the width $2\epsilon_0$ of the slot and the diameter $\phi$ of the wire electrode and storing their data in advance, the amount of flexing of the wire electrode can be determined through effecting the arithmetic operations of the equations (10), (11). $F_0$ is stored in the NC unit as the cutting speed upon measurement of $D_0$ simultaneously with $D_0$.

(C) Correction of the path of the wire electrode:

After the amounts of flexing $D_T$, $D_R$ in the tangential and radial directions have been determined, the path of the wire electrode is corrected.

In order for the flexing wire electrode to trace a commanded path, the commanded path should be corrected for the intervals $D_T$, $D_R$ as described above. More specifically, when cutting the workpiece along the arc having a radius of curvature R as shown in FIG. 9, the commanded path should be corrected so as to be an arc having a radius of curvature $(R + \Delta R)$, which is advanced $D_T$, $D_R$ respectively in the tangential and radial directions. The relationship between the radius of curvature R of the commanded path for arcuate cutting and the difference $\Delta R$ between the radius of curvature R and that of a corrected arcuate path is as follows:

$$\Delta R = \sqrt{D_T^2 + (R + D_R)^2} - R \quad (12)$$

Therefore, by previously measuring and storing in a memory the amount of flexing $D_0$ upon rectilinear cutting at the cutting speed $F_0$, $D_T$, $D_R$ can be calculated by giving the cutting command speed F, and $\Delta R$ can be calculated from the equation (12) for correcting the radius of curvature R of the corner.

Operation for cutting a corner having a corner angle and a radius of curvature $R_0$ as shown by the solid lines in FIG. 11 will now be described.

Figure 11:
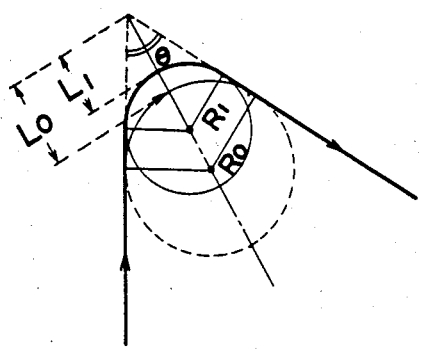
FIG. 11 is a diagram showing the way in which the radius of a corrected path is determined for cutting a corner having a corner angle $\theta$ and a radius of curvature $R_0$.

Assuming that, in FIG. 11, a commanded path has a radius of curvature $R_0$ and a corrected path (shown by the dot-and-dash line) has a radius of curvature $R_1$, the following results geometrically:

$$R_1 = (L_1 + R_1) \sin \frac{\theta}{2} \tag{13}$$

Hence, $$L_1 = \frac{R_1}{\sin \frac{\theta}{2}} - R_1 \tag{14}$$

Therefore, $$L_0 - L_1 = \left( \frac{1}{\sin \frac{\theta}{2}} - 1 \right) (R_0 - R_1) \tag{15}$$

By equalizing $(L_0 - L_1)$ with $\Delta R$ in the equation (12), $$R_0 - R_1 = \frac{\sin \frac{\theta}{2}}{1 - \sin \frac{\theta}{2}} \Delta R \tag{16}$$

Hence, $$R_1 = R_0 - \frac{\sin \frac{\theta}{2}}{1 - \sin \frac{\theta}{2}} R\{ \sqrt{D_T^2 + (R_0 + D_R)^2} - R_0 \} \tag{17}$$

From the equation (17), when $\theta = 0$, $R_1 = R_0$.

Figure 12:
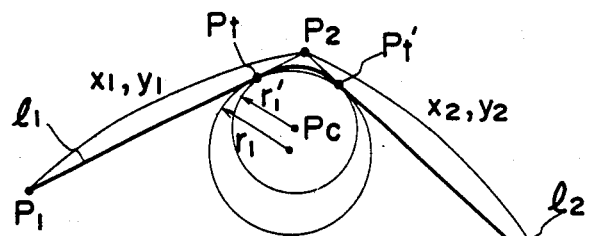
FIG. 12 is a diagram explanatory of a cutting control method according to the present invention for cutting a corner.

Based on the foregoing, an arcuate corner shape can be corrected in the following steps with reference to FIG. 12.

(a) NC data which specifies a corner arc is punched in a paper tape. The corner arc is not indicated by an ordinary arc command, but directly by the radius of curvature of the corner arc according to the following:

$$\left. \begin{array}{l} Xx_1 \ Yy_1 \ Rr_1 \\ Xx_2 \ Yy_2 \end{array} \right\} \tag{18}$$

(b) The corner angle $\theta$ is determined from the commanded NC data, and the corner angle $\theta$, the radius of curvature $r_1$, the amount of flexing $D_T$ in the tangential direction, and the amount of flexing $D_R$ in the radial direction are used to calculate a radius of curvature $r_1'$ as corrected by the equation (17). The corner angle $\theta$ may be included in the NC data in advance.

(c) The coordinates of the center of curvature Pc of an arc which contacts straight lines $l_1$, $l_2$ and has the radius of curvature $r_1'$, and the coordinates of points of contact Pt, Pt' are determined.

(d) The wire electrode is moved relatively to the workpiece along the straight line $\overline{P1Pt'} \to$ the arc $\overset{\frown}{PtPt'} \to$ the straight line $\overline{Pt'P_3}$.

Figure 13:
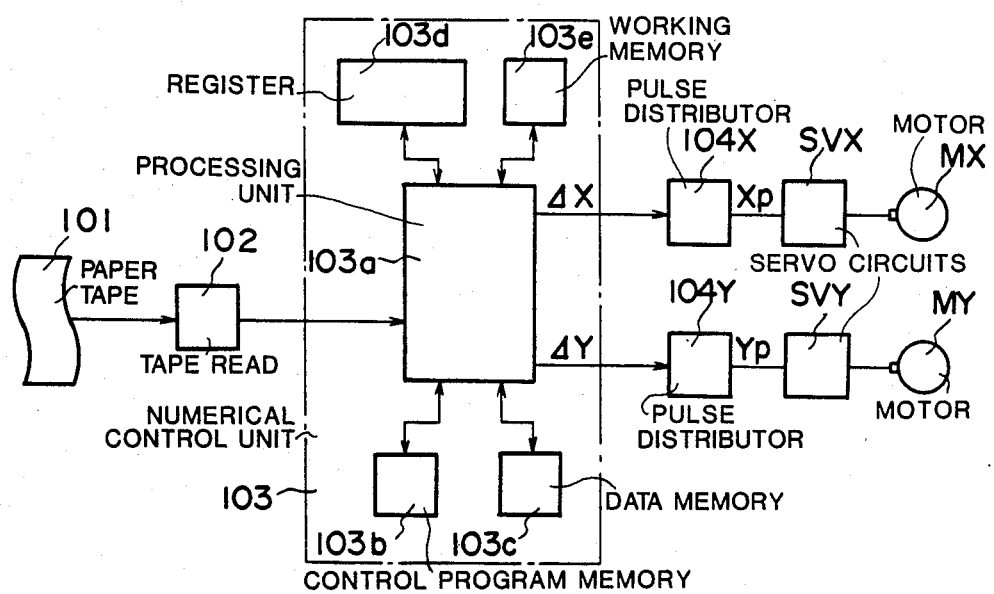
FIG. 13 is a block diagram of an arrangement for effecting the cutting control method of the present invention.

FIG. 13 is a block diagram of an arrangement for effecting a cutting control method according to the present invention. Designated at 101 is a paper tape in which a cutting program (NC data) is punched, and 102 a tape reader. The NC program contains numerical data (positional command data and path command data), M function instruction data, G function instruction data, and the like. A numerical control unit 103 comprises a microcomputer including a processing unit 103a, a control program memory 103b, a data memory 103c, a register 103d for storing the cutting speed F₀, the amount of flexing D₀ at the cutting speed, the slot width 2ε₀ and the like, and a working memory 103e.

Designated at 104X, 104Y are pulse distributors, SVX, SVY servo circuits, MX, MY motors for respective axes.

When the processing unit 103a is supplied with corner shape data see formula a (18) from the paper tape 101, the processing unit 103a utilizes data stored in the register 103d to calculate an amount of flexing $D_T$ in the tangential direction and an amount of flexing $D_R$ in the radial direction from the equations (8), (9), and stores these calculated amounts into the working memory 103e. Then, the corner shape data is used to determine a corner angle $\theta$, and a corrected radius of curvature $r_1'$ is calculated from the equation (17) using the corner angle $\theta$, the radius of curvature r of the corner, the amount of flexing $D_T$ in the tangential direction, and the amount of flexing $D_R$ in the radial direction. Thereafter, the coordinates of the center of curvature Pc of an arc having the radius of curvature $r_1'$ and contacting the straight lines $l_1$, $l_2$ (FIG. 12), and the coordinates of the points of contact Pt, Pt' are determined, the coordinates of the points Pc, Pt, Pt' being stored into the working memory. Increments $\Delta X$, $\Delta Y$ from a point $P_1$ to the contact point Pt are determined and supplied to the following pulse distributors 104X, 104Y. The pulse distributors 104X, 104Y effect an arithmetic operation for pulse distribution based on the increments $\Delta X$, $\Delta Y$ to supply distributed pulses Xp, Yp to the servo circuits SVX, SVY to thereby drive the motors MX, MY. Thus, the workpiece is moved with respect to the wire electrode from the point $P_1$ to the contact point Pt. When the pulse distribution up to the contact point Pt is finished, the processing unit 103a generates data required for pulse distribution for the arc $\overset{\frown}{PtPt'}$ using the coordinates of the points Pt, Pc, Pt', and delivers the generated data to the pulse distributors 104X, 104Y to move the workpiece along the arc $\overset{\frown}{PtPt'}$. Finally, increments $\Delta X'$, $\Delta Y'$ from the contact point Pt' to the point $P_1$ are determined, and the workpiece is moved from the contact point Pt' to the point $P_1$ by pulse distribution based on the increments $\Delta X'$, $\Delta Y'$, whereupon cutting of the corner shape is completed.

The present invention is highly advantageous in that electric discharge cutting can be effected along an accurate cutting path by correcting the radius of curvature of a corner to be cut irrespective of flexing of a wire electrode, and the radius of curvature of the corner can automatically be corrected simply by giving data on the radius of curvature and determining flexing of the wire electrode upon rectilinear cutting.

What is claimed is:

1. A method of controlling a wire-cut electric discharge machine to apply a voltage between a wire electrode and a workpiece of relatively uniform thickness for cutting a corner of the workpiece with electric discharge energy while the wire electrode and the workpiece are being moved relative to each other based on cutting command data including commanded radius data to thereby cut the workpiece to a predetermined shape, said method comprising the steps of:

(a) storing data Do on an amount of flexing of the wire electrode as measured upon rectilinear cutting before the actual corner machining operation;

(b) calculating an amount of flexing $D_T$ of the wire electrode in a tangential direction to the path along which the workpiece is cut by the wire and an amount of flexing $D_R$ of the wire electrode in a radial direction to the path along which the workpiece is cut by the wire on the base of said data D₀;

(c) calculating a corrected radius of curvature $R_1$ of a corner to be cut on the basis of said amount of flexing $D_T$ and said amount of flexing $D_R$; and (d) moving the wire electrode and workpiece with respect to each other along an arc determined by the corrected radius of curvature $R_1$ of the corner for electric discharge cutting of the workpiece.

2. A method according to claim 1, wherein the amount of flexing $D_T$ and the amount of flexing $D_R$ are calculated from said $D_0$, and a corrected radius of curavature $R_1$ is determined using said amounts $D_T$, $D_R$, a corner angle $\theta$, a radius of curvature R to cut the workpiece, and a radius of curvature Ro of the corner through the arithmetic operation:

$$R_1 = Ro - \frac{\sin \frac{\theta}{2}}{1 - \sin \frac{\theta}{2}} \left( \sqrt{D_T^2 + (Ro + D_R)^2} - Ro \right)$$

3. A method according to claim 2, wherein said amount of flexing $D_T$ in the tangential direction and said amount of flexing $D_R$ in the radial direction at a cutting speed F are determined by the following arithmetic operations:

$$D_T = \frac{F}{F_0} D_0$$

$$D_R = \frac{4}{3\pi} \frac{F}{F_0} \frac{\epsilon_0}{R_0}$$

where $F_0$ is the cutting speed at which the amount of flexing $D_0$ is generated, $R_0$ is the radius of curvature of the corner, and $2\epsilon_0$ is the width of a slot to be cut.

* * * * *

UNITED STATES PATENT AND TRADEMARK OFFICE
CERTIFICATE OF CORRECTION

PATENT NO. : 4,520,253

DATED : May 28, 1985

INVENTOR(S) : GAMO et al.

It is certified that error appears in the above-identified patent and that said Letters Patent is hereby corrected as shown below:

FRONT PAGE
(57) ABSTRACT

Line 10, "$(1_1,1_2)$" s/b --$\ell_1,\ell_2$--;

Line 11, "PlPt'" s/b --$\overline{P1Pt'}$--;
Line 11, "PtPt'," s/b --$\overline{PtPt'}$,--;
Line 12, "PtP 3" s/b --$\overline{PtP3}$--.

Col. 3
Line 54, "θdt" s/b --$\dot{\theta}dt$--;
Line 54, "dV" s/b --$d\dot{V}$--;
Line 66, "F=Rθ" s/b --$F=R\dot{\theta}$--.

Col. 4
Line 7, "dV" s/b --$d\dot{V}$--;
Line 11, "V= $2F\epsilon_0$" s/b $\dot{V}=2F\epsilon_0$--;

Line 24, "dV" s/b --$d\dot{V}$--;
Line 59, "V" s/b --$\dot{V}$--.

Col. 6
Line 7, "$F_0$," s/b --$D_0$,--;

Line 32, "$D_0$" s/b --$F_0$--.

UNITED STATES PATENT AND TRADEMARK OFFICE
CERTIFICATE OF CORRECTION

PATENT NO. : 4,520,253

DATED : 5/28/85

INVENTOR(S) : GAMO et al.

It is certified that error appears in the above-identified patent and that said Letters Patent is hereby corrected as shown below:

Col. 7
Line 52, "$l_1, l_2$" s/b --$\ell_1, \ell_2$--;

Col. 8
Line 7, "see formula a (18)" s/b --(see formula 18)--;
Line 21, "$l_1, l_2$" s/b --$\ell_1, \ell_2$--.

Signed and Sealed this

Fifteenth Day of October 1985

[SEAL]

Attest:

*Attesting Officer*

DONALD J. QUIGG

*Commissioner of Patents and Trademarks—Designate*